US011367046B2

(12) United States Patent
Korver

(10) Patent No.: US 11,367,046 B2
(45) Date of Patent: Jun. 21, 2022

(54) METHOD AND SYSTEM FOR TRACKING INVENTORY

(71) Applicant: Target Brands, Inc., Minneapolis, MN (US)

(72) Inventor: Aaron Korver, Hastings, MN (US)

(73) Assignee: TARGET BRANDS, INC., Minneapolis, MN (US)

(*) Notice: Subject to any disclaimer, the term of this patent is extended or adjusted under 35 U.S.C. 154(b) by 52 days.

(21) Appl. No.: 16/279,681

(22) Filed: Feb. 19, 2019

(65) Prior Publication Data

US 2019/0258996 A1   Aug. 22, 2019

Related U.S. Application Data

(60) Provisional application No. 62/632,069, filed on Feb. 19, 2018.

(51) Int. Cl.
*G06Q 10/08* (2012.01)
*G06F 16/22* (2019.01)

(52) U.S. Cl.
CPC ......... *G06Q 10/0875* (2013.01); *G06F 16/22* (2019.01)

(58) Field of Classification Search
CPC .................. G06Q 10/0875; G06F 16/22
See application file for complete search history.

(56) References Cited

U.S. PATENT DOCUMENTS

| 7,668,761 | B2* | 2/2010 | Jenkins | G06Q 10/087 |
| | | | | 705/28 |
| 2007/0016632 | A1* | 1/2007 | Schulz | G06F 16/275 |
| 2009/0125350 | A1 | 5/2009 | Lessing et al. | |
| 2009/0319401 | A1* | 12/2009 | Rao | G06Q 10/087 |
| | | | | 705/29 |
| 2014/0040182 | A1* | 2/2014 | Gilder | G06Q 40/12 |
| | | | | 707/602 |
| 2015/0012396 | A1* | 1/2015 | Puerini | G06K 9/00771 |
| | | | | 705/28 |
| 2017/0255900 | A1* | 9/2017 | High | G06Q 10/087 |

FOREIGN PATENT DOCUMENTS

CN         102542432 A  *  7/2012

OTHER PUBLICATIONS

Yuqun Zhang, Predicting Inventory Shipments of Oracle EBS Systems, Jun. 1, 2016, 2016 IEEE International Conference on Services Computing (SCC), pp. 515-522 (Year: 2016).*

* cited by examiner

*Primary Examiner* — Sangeeta Bahl
*Assistant Examiner* — Aaron N Tutor
(74) *Attorney, Agent, or Firm* — Merchant & Gould P.C.

(57) ABSTRACT

Methods and systems for optimizing item assortments are disclosed. One method includes receiving a request for an optimized assortment. Data relating to items within a selected initial item assortment and item universe is accessed. Constraints are applied to the items in the assortment to arrive at an optimized item assortment. Constraints include goals for optimization, lock in and lock out rules, and item attribute rules. The method may be performed by a system including one or more computing devices communicating via a network with one or more data storage devices.

18 Claims, 10 Drawing Sheets

METHOD AND SYSTEM FOR TRACKING INVENTORY

CROSS-REFERENCE TO RELATED APPLICATIONS

The present application claims priority from U.S. Provisional Patent Application No. 62/632,069, filed on Feb. 19, 2018, the disclosure of which is hereby incorporated by reference in its entirety.

TECHNICAL FIELD

The present disclosure relates generally to methods and systems for tracking inventory within a supply chain. More particularly, the present disclosure describes an event-based system architecture for tracking the inventory of items at multiple locations within a retail enterprise in real time.

BACKGROUND

In retail operations, inventory management is a crucial part of the business. It is important to monitor inventory levels and movements at multiple locations with a supply chain for the retail operation. Many crucial decisions for inventory management rely on accurate accounting of inventory levels. However, with enterprises of substantial size and managing a large and constantly-changing inventory, it can be difficult to determine at any particular time an inventory level for particular items across the enterprise. For example, items in transit may be credited as being positioned at neither or both of the source and destination locations depending upon the time at which stock counts are taken at those respective locations.

SUMMARY

In summary, the present disclosure relates to methods and systems for tracking inventory within a retail supply chain. Various aspects are described in this disclosure, which include, but are not limited to, the following aspects.

In one aspect, a system for tracking inventory across a supply chain is described. The supply chain includes a plurality of retail locations and a plurality of distribution locations. The system includes an inventory tracking engine comprising a computing system that includes a processor and a memory communicatively coupled to the processor. The memory stores instructions executable by the processor to: receive one or more inventory events; transform the one or more inventory events into separate inventory transactions for each item involved in the event; analyze the inventory transactions to determine how many units of each item moved to or from each location involved in the events; and record updated inventory counts in an inventory database.

In another aspect, a method of tracking inventory across a supply chain including a plurality of retail locations and a plurality of distribution locations is provided. An inventory event is received at a computing system. An inventory event may be a transfer order, a purchase order, a sale, or an inventory adjustment event. The inventory event is transformed into separate inventory transactions for one or more items involved in the inventory event. The computing system then analyzes the inventory transactions to determine how many units of each of the one or more items have moved to or from each location involved in the inventory event. Finally, an updated inventory count for each item and location is recorded in an inventory database.

In a further aspect, a system for tracking inventory across a supply chain including a plurality of retail locations and a plurality of distribution locations is disclosed. The system includes a computing system including a processor, and a memory communicatively coupled to the processor, the memory storing instructions executable by the processor to expose an application programming interface providing access to near-realtime inventory information and an inventory tracking engine. When executed, the instructions cause the computing system to: receive a data stream comprising a plurality of realtime inventory events, the inventory events comprising transfer orders, purchase orders, sales events, inventory adjustment events, and combinations thereof; atomize the data stream in realtime, the data stream including the plurality of inventory events into separate inventory transactions for each item involved in the event; analyze the inventory transactions to determine how many units of each item moved to or from each location involved in the events; record updated inventory counts in an inventory database, the inventory database maintaining near-realtime inventory information; receive, concurrently with the data stream, a query at the application programming interface from a user application; and in response to the query, provide access to near-realtime inventory levels reflected in the inventory database at an item level without requiring aggregation of inventory information from store-level inventory systems.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
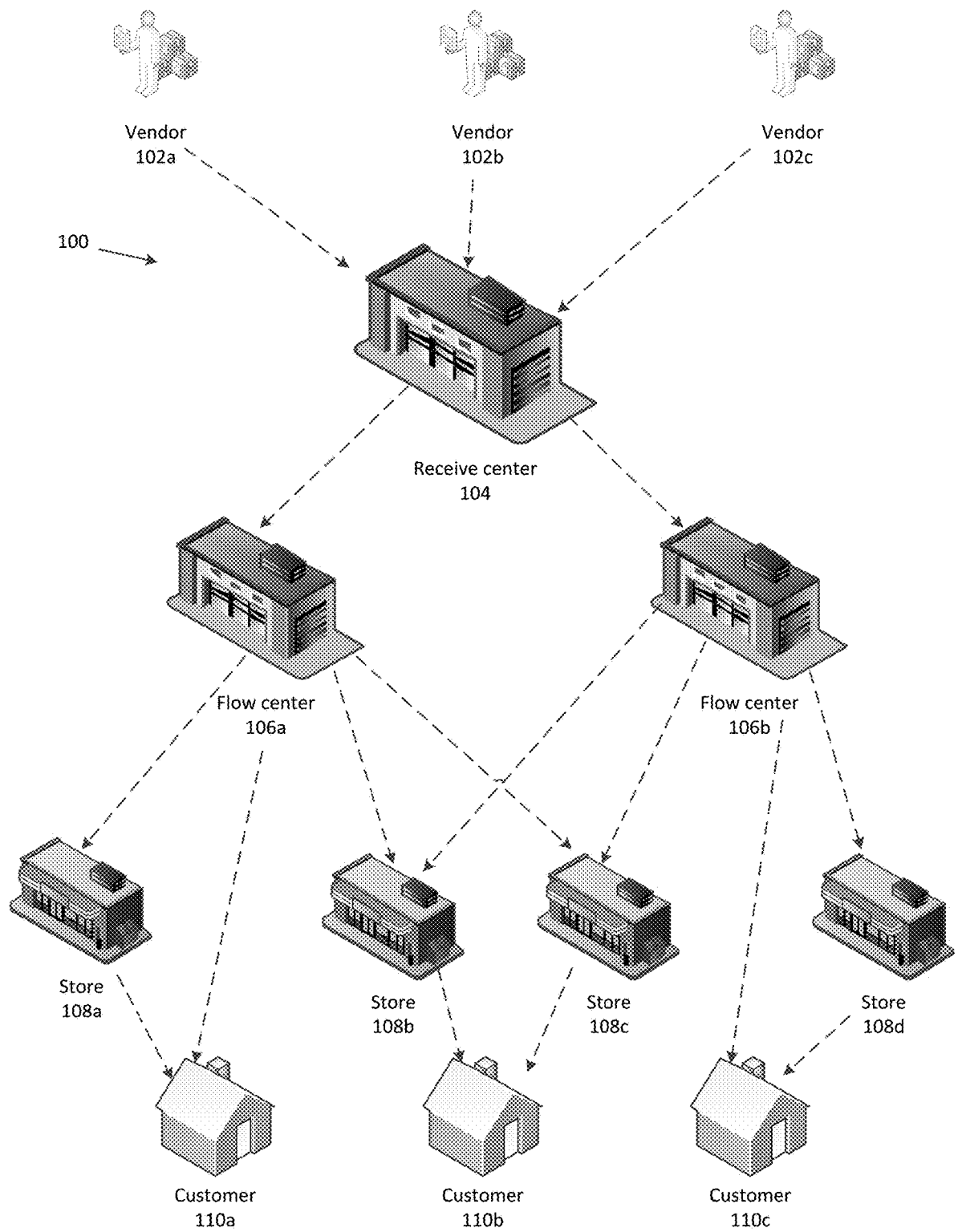
FIG. 1 illustrates a schematic diagram of an example supply chain for a retail enterprise.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes inventory management systems and methods which track all inventory of items within a retail supply chain. Inventory transactions are monitored and can include sales events, purchase orders, transfer orders, and other inventory movements between nodes of the supply chain. Nodes can include warehouses, distribution centers, receive centers, flow centers, stock rooms, and retail stores. Individual item counts for each node are recorded in an inventory database. An inventory application programming interface (API) allows users to view current inventory information for all of the various items within the supply chain.

The methods and systems described herein are useable in conjunction with an event-driven architecture for real-time replenishment of inventory, tracked on a per-item basis. Demand forecasting is utilized to anticipate customer demand at each location for each item. The event-driven architecture allows for both a reduction in the amount of inventory that is stored at any time, both throughout an enterprise and at retail locations in particular, while also being able to reliably respond more quickly to customer demand. When used in that context, and in a manner unified with the supply chain management system, the inventory management systems described herein provide a near-real-time, accurate view of inventory positioning without requiring querying of various locations within the supply chain, thereby improving accuracy and efficiency in providing supply chain levels for reporting and planning purposes.

FIG. 1 illustrates a schematic diagram 100 of an example supply chain for a retail enterprise. The diagram 100 illustrates the flow of inventory from vendor 102 to customer 110. The inventory moves through various nodes to arrive at the customer. In this example, the nodes include a receive center 104, two flow centers 106a, 106b, four retail stores 108a, 108b, 108c, 108d, and three customer residences 110a, 110b, 110c. In practice, the supply chain could include many more nodes in different proportions. In some embodiments, there are not separate receive centers and flow centers. Instead, there may be one type of warehouse or distribution center for holding inventory before distributing to stores and customers. Arrows in the diagram indicate movement of inventory. Inventory will typically flow downward through the supply chain, but in some instances inventory may move between flow centers 106 or between retail stores 108. In some embodiments, inventory may even move from a flow center 106 to a receive center 104 or from a retail store 108 to a flow center 106.

Vendors 102 produce the items or products that will be sold by the retail entity. A purchase order is typically placed to request products from a vendor. In some instances, the vendor 102 will transport the ordered products to a receive center 104. In other instances, the retail entity arranges for the products to be picked up from the vendor 102 and transported to the receive center 104. Once at the receive center 104, the products are prepared for transportation to one or more flow centers.

A variety of products are prepared for shipment to one or more flow centers 106. The flow centers 106 are typically positioned to enable quick shipment to one or more retail stores 108. Each flow center 106 may supply inventory to multiple retail stores 108. In some instances, more than one flow center 106 will send inventory to a retail store 108. For example, in FIG. 1, flow center 106a distributes inventory to stores 108a, 108b, and 108c. Flow center 106b distributes to stores 108b, 108c, and 108d. In some instances, to the extent products received at a flow center 106 are not already broken down into individual units, the products may be broken down into individual units in order to distribute individual items to stores 108, or optionally to fill online orders that will be delivered directly to customers from the flow center 106 or store 108. In the example of FIG. 1, products are shipped directly from flow center 106a to a customer 110a and from flow center 106b to customer 110c.

Once products arrive at the retail stores 108, they are available for in-store purchases, pick-up orders, or local delivery. Depending on the location of a customer ordering products online, the shipments of products could come from one or more retail stores 108. For instance, customer 110b could receive shipments of products from either store 108b or store 108c.

It is noted that, between receive centers 108, flow centers 106, and stores 108, there may be preexisting, predetermined delivery routes established. For example, there may be daily or weekly transit routes between a receive center and one or more flow centers. The receive center can provide to the flow centers the selection of individual items that are needed by stores 108 serviced by the one or more flow centers proximate to and/or servicing those stores. The flow centers can also have daily or other periodic transportation routes established to stores that are serviced, thereby ensuring prompt replenishment of items at stores in response to item sales.

In addition, the predetermined delivery routes can be used for various purposes. For example, in some situations, the predetermined delivery routes can be used to deliver products in various forms. As explained in further detail below, items distributed via the supply chain are tracked on an individual (per-item) basis; as such, items can be delivered to stores 108 in any convenient manner. In some example embodiments, items are tracked on an individual basis, but may be grouped at a flow center 106 to simplify restocking of the store 108, for example by placing together in a package a collection of individual items of different types but which may easily be stocked conveniently once those items arrive at a store 108. For example, goods that are located in a common department, row, or shelf of a store can be grouped and packed together at the flow center 106. Once those items reach the store 108, a restocking operation can restock each of the items in that shelf, row, or department easily. Still further, because items are packed and tracked on an individual basis at the flow center and sent to stores based, at least in part, on demand signals received from stores, the item collections are based on the number of items sold and therefore the restocking operation can provide a package of items that will fit on store shelves, rather than requiring additional backroom stocking and storage.

In the context of the present disclosure, a supply chain management system is provided that assists in coordination of product shipments among nodes of the supply chain, and uses inventory models to automatically rebalance inventory within the supply chain of the enterprise to ensure predicted and actual item demand from customers of the enterprise is fulfilled to a predetermined threshold success rate. The supply chain management system allows for balancing of items across the supply chain based on inventory and demand models, as well as real time demand signals, and performs automated generation of purchase and transfer orders throughout the supply chain based on such demand and lead time calculations between paints both within and external to the supply chain. Accordingly, as noted below, substantial advantages are realized using the methods and systems of the present disclosure.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders.

Figure 2:
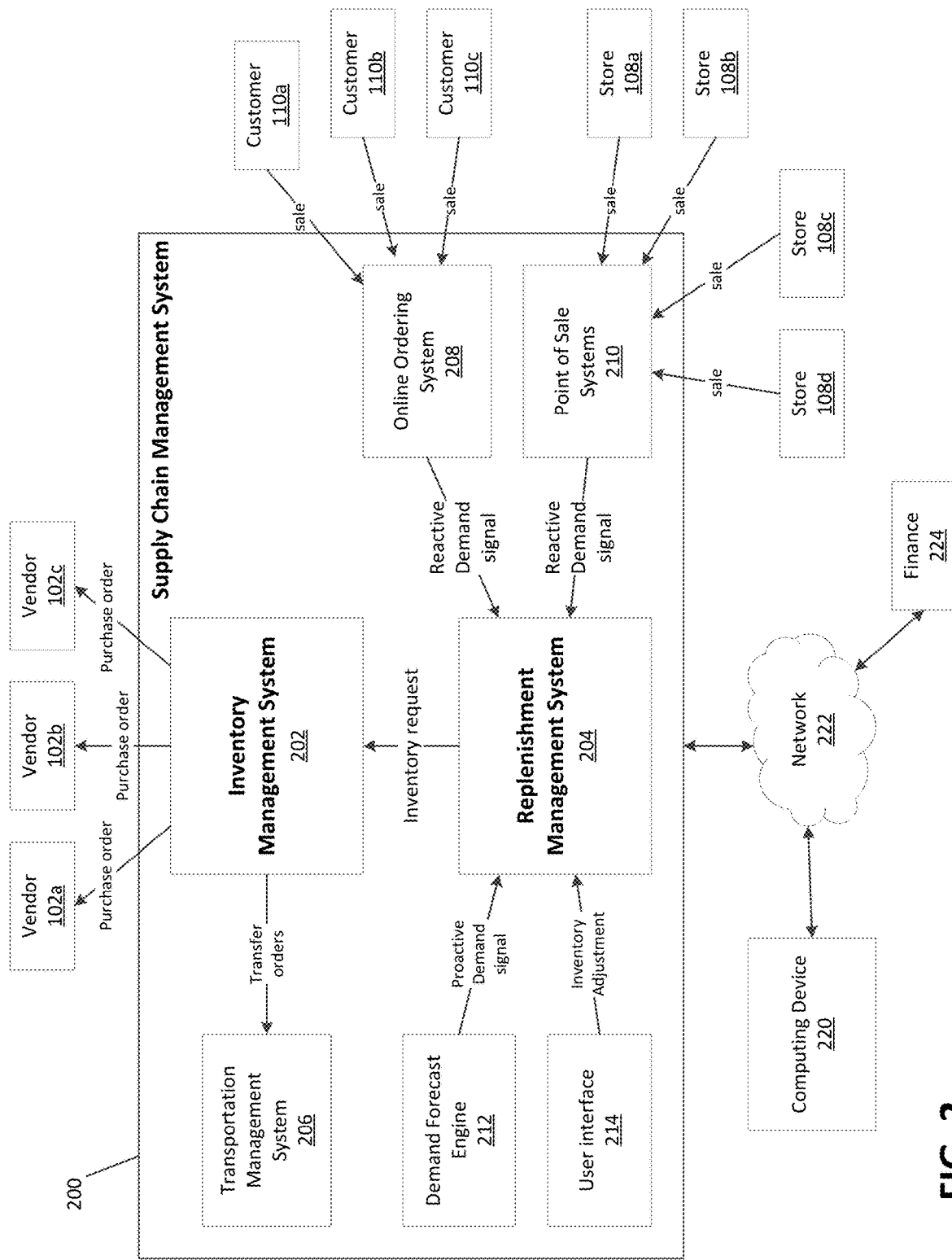
FIG. 2 illustrates a schematic diagram of an example supply chain management system.

FIG. 2 illustrates a schematic diagram of an example system 200 for managing a supply chain. The key components of the supply chain management system 200 are an inventory management system 202 and a replenishment management system 204. Together, the inventory management system 202 and replenishment management system 204 operate to monitor inventory levels across all nodes of a supply chain, determine if and when adjustments to inventory levels need to be made, and facilitate transport of inventory between nodes to respond to customer demand. An example supply chain management system is further described in copending U.S. patent application Ser. No. 15/898,837, filed Feb. 19, 2018, the disclosure of which is hereby incorporated by reference in its entirety.

The inventory management system 202 receives inventory requests from the replenishment management system 204. In response to the inventory requests, the inventory management system 202 determines whether additional inventory is needed at one or more nodes within the supply chain to satisfy the request. Additional inventory may be transported to one node from another node if sufficient stock of the needed product(s) is available within the required timeframe within the supply chain. In such instances, transfer orders are issued to the transportation management system 206. If the inventory management system 202 determines that there is not sufficient stock of the requested products at another node or that transporting the products within the supply chain would be too costly or time consuming, additional stock is ordered from one or more vendors 102 through purchase orders issued from the inventory management system 202. The inventory management system 202 is further described with respect to FIG. 3.

The replenishment management system 204 receives demand signals from an online ordering system 208, one or more point of sale systems 210, and a demand forecast engine 212. The demand signals can be proactive or reactive. Proactive demand signals come from the demand forecast engine 212 and are generated by predicting expected customer demand for individual products on a day by day basis. Reactive demand signals come from sales made at the point of sale system 210 or through the online ordering system 208. The online ordering system 208 receives orders from customers 110 and coordinates fulfillment of those orders. The point of sale systems 210 record sales that are made at stores 108. The replenishment management system 204 also receives inventory adjustments from the user interface 214. Inventory adjustments are instructions received from a user to modify inventory levels at one or more locations or nodes within the supply chain. Inventory adjustments may be made for reasons other than expected or actual customer demand for particular items. The replenishment management system 204 is further described with respect to FIG. 3.

In some embodiments the supply chain management system 200 communicates with a computing device 220 through a network 222. The network 222 can be any of a variety of types of public or private communications networks, such as the Internet. The computing device 220 can be any network-connected device including desktop computers, laptop computers, tablet computing devices, smartphones, and other devices capable of connecting to the Internet through wireless or wired connections. In some instances, the supply chain management system 200 also communicates with a finance system 224 through the network 222.

Figure 3:
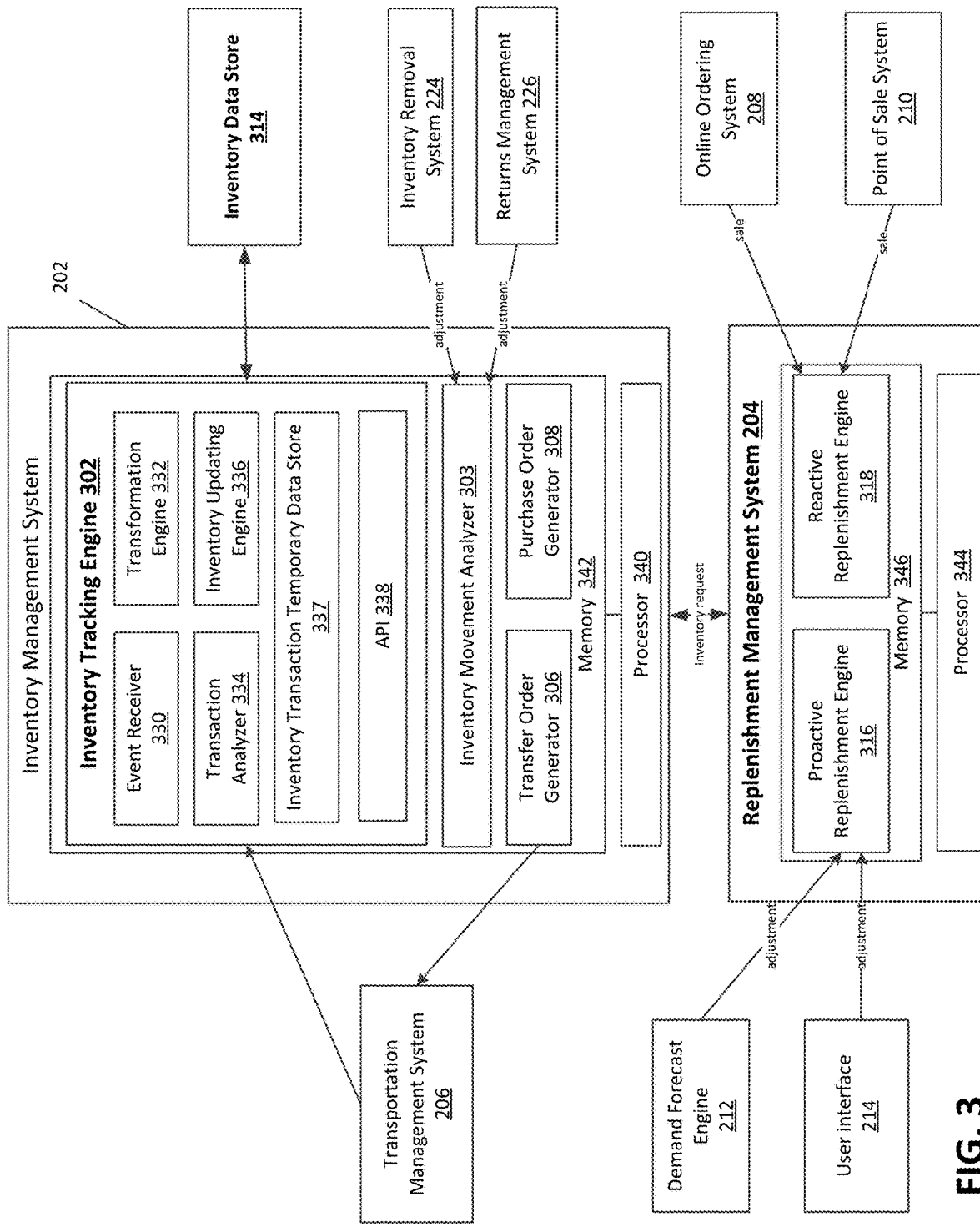
FIG. 3 illustrates a more detailed view of the inventory management system of FIG. 2.

FIG. 3 shows a more detailed schematic of the inventory management system 202 and replenishment management system 204. The inventory management system 202 includes an inventory tracking engine 302, inventory movement analyzer 303, a transfer order generator 306, and a purchase order generator 308. The inventory management system 202 also includes a processor 340 and memory 342 operatively connected to the processor 340; the memory 342 stores the operative instructions organized into various operative components of the inventory tracking engine 302, as well as inventory movement analyzer 303, transfer order generator 306, and purchase order generator 308.

The inventory management system 202 receives inventory requests from the replenishment management system 204. The replenishment management system 204 includes at least a proactive replenishment system 316 and a reactive replenishment engine 318. The replenishment management system 204 also includes a processor 344 and memory 346 operatively connected to the processor 344, which stores operative instructions executed by processor 344 including the proactive replenishment engine 316 and reactive replenishment engine 318. The proactive replenishment engine 316 receives inventory adjustment signals from the demand forecast engine 212 and the user interface 214. The reactive replenishment engine 318 receives demand signals in the form of sales from the online ordering system 208 and the point of sale system 210.

In response to the inventory requests, the inventory management system 202 determines whether additional inventory is needed at one or more nodes within the supply chain to satisfy the request. The inventory tracking engine 302 determines the current inventory levels of each node and tracks movements of inventory throughout the supply chain. The inventory tracking engine 302 receives updates on every movement of inventory within the supply chain from the transportation management system 206. The inventory tracking engine 302 updates the inventory data store 314 as inventory levels change in real-time. The inventory movement analyzer 303 utilizes the information in the inventory data store 314 to determine if any inventory needs to be moved within the supply chain as the inventory levels change at each node of the supply chain.

Additional inventory may be transported to one node from another node if sufficient stock of the needed product(s) is available within the required timeframe within the supply chain. In such instances, transfer orders are issued to the transportation management system 206 by the transfer order generator 306. If the inventory management system 202 determines that there is not sufficient stock of the requested products at another node or that transporting the products within the supply chain would be too costly or time consuming, additional stock is ordered from one or more vendors 102 through purchase orders issued from the purchase order generator 308.

The inventory movement analyzer 303 receives status updates from the inventory tracking engine 302 and analyzes the changing inventory levels at each node within the supply chain to determine if any inventory movements are needed. The inventory movement analyzer 303 receives inventory requests from the replenishment management system 204, the inventory removal system 224, and the returns management system 226. Based on these inventory requests, the inventory movement analyzer 303 determines whether the inventory levels are at their preferred levels. The preferred levels are determined on a per-item basis for each day. The inventory goals could change from day to day for each item and node location. The inventory movement analyzer 303 evaluates the current inventory levels at each node and compares them to that day's goal and the following day's goal to determine if inventory movements need to be changed to redistribute inventory.

The inventory movement analyzer 303 determines how items should be moved between nodes of the supply chain, based on the inventory goals. If inventory is available within the supply chain to satisfy an inventory request and the costs are not too high to move the inventory, the inventory movement analyzer 303 will send a signal to the transfer order generator 304. If the inventory movement analyzer 303 determines that there is insufficient supply of an item within the supply chain to satisfy an inventory request or that the cost of moving items outweighs the cost of ordering new stock, the inventory movement analyzer 303 sends a signal to the purchase order generator 306.

The inventory removal system 224 and returns management system 226 provide inputs to the inventory movement analyzer 303 to request the movement of inventory within the supply chain. The inventory removal system 224 is responsible for removing items from the supply chain. In some instances, the items will be automatically removed after a period of time, for example, after a predetermined shelf life for perishable produce and other fresh grocery items. In other instances, the items are removed after the inventory removal system 224 receives a notification to remove one or more items from the supply chain. For example, one or more seasonal items may be removed at the conclusion of a particular shopping season. In another example, as discussed below, the items could be removed following a return if the items are no longer in condition for re-sale to another customer. Items may need to move to different nodes in order to be properly removed from the supply chain.

The returns management system 226 operates to determine how to redistribute items that have been returned by customers following a purchase. In some instances, the returned item or items are transferred to other nodes or remain where they were received from the customer. Those items are then made available for re-sale to another customer. In other instances, the returned item or items are not eligible for re-sale and are marked for removal from the supply chain by the inventory removal system 224.

The transfer order generator 306 communicates with the transportation management system 206 to transfer stock of products from one node to another. Transfer orders are generated when the inventory management system 202 has received an inventory request and the inventory movement analyzer 303 has determined that the additional inventory can be moved from another node.

The purchase order generator 308 sends orders to vendors for additional stock of products. Purchase orders are generated when the inventory management system 202 has received an inventory request and the inventory movement analyzer 303 in conjunction with the cost analyzer 322 has determined that it would be more cost and/or time efficient to get the additional inventory from a vendor than from another node. Purchase orders are communicated to the transportation management system 206 in order for transportation of the products from the vendor to a receive center to be arranged.

The inventory tracking engine 302 includes an event receiver 330, a transformation engine 332, a transaction analyzer 334, an inventory updating engine 336, and an API 338. The inventory tracking engine 302 communicates with an inventory data store 314. In some embodiments, more than one inventory data store are in communication with the inventory tracking engine 302. The inventory tracking engine 302 is further described in relation to the method 500 of FIG. 5. The API 338 allows a front-end user interface to query the inventory data store 314 and/or inventory transaction temporary data store 337 to receive information regarding inventory levels at one, some, or all locations across the enterprise. Accordingly, via the API 338, a user application can view near-realtime current inventory levels at a per-item level. Furthermore, because the inventory data store 314 is maintained up to date in a near-realtime basis, aggregation of inventory information from store-level inventory systems is not required to provide updated inventory levels to a requesting user or application.

Figure 4:
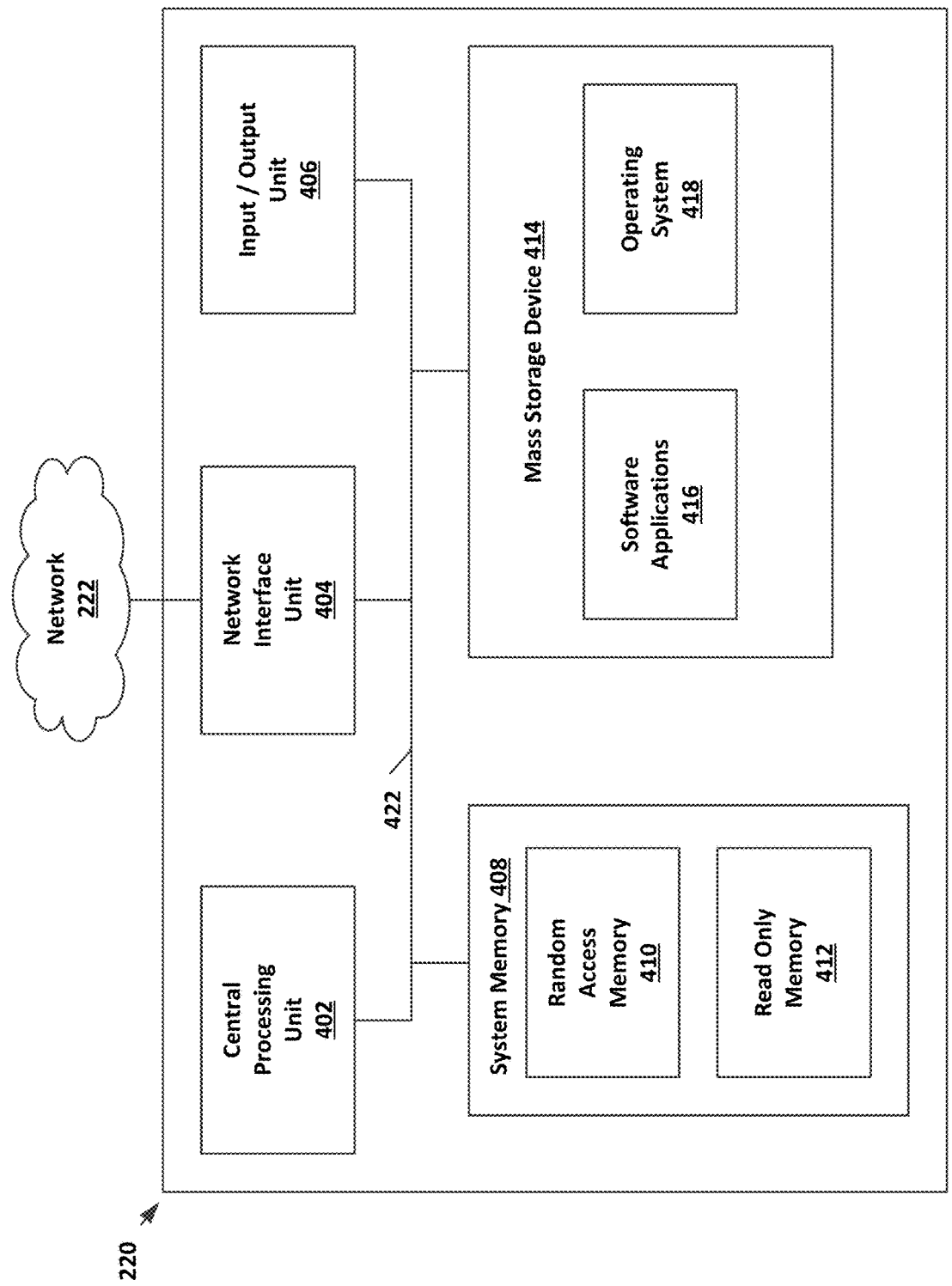
FIG. 4 illustrates an example block diagram of a computing system usable in the supply chain management system of FIG. 2.

Referring now to FIG. 4, an example block diagram of a computing system 220 is shown that is useable to implement aspects of the supply chain management system 200 of FIG. 2. In the embodiment shown, the computing system 220 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing system 220, such as during startup, is stored in the ROM 412. The computing system 20420 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing system 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 220.

According to various embodiments of the invention, the computing system 220 may operate in a networked environment using logical connections to remote network devices through a network 222, such as a wireless network, the Internet, or another type of network. The computing system 220 may connect to the network 222 through a network interface unit 404 connected to the system bus 422. It should be appreciated that the network interface unit 404 may also be utilized to connect to other types of networks and remote computing systems. The computing system 220 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing system 220 can store software instructions and data. The software instructions include an operating system 418 suitable for controlling the operation of the computing system 220. The mass storage device 414 and/or the RAM 410 also store software instructions, that when executed by the CPU 402, cause the computing system 220 to provide the functionality discussed in this document. For example, the mass storage device 414 and/or the RAM 410 can store software instructions that, when executed by the CPU 402, cause the computing system 220 to receive and analyze inventory and demand data.

Figure 5:
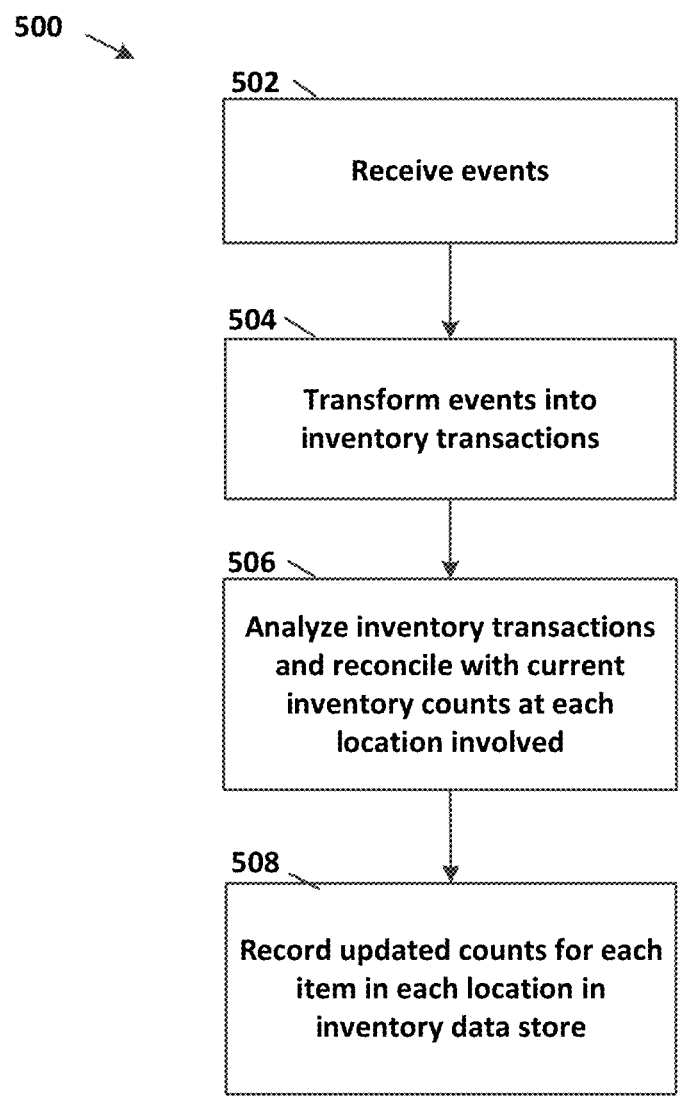
FIG. 5 illustrates a flow diagram of a method of tracking inventory within a retail supply chain.

FIG. 5 displays a flow diagram of a method 500 of tracking inventory within a retail supply chain. The supply chain includes a plurality of retail locations and a plurality of distribution locations. The supply chain may be structured like the example supply chain depicted in FIG. 1. In some embodiments, the method 500 is performed by an inventory tracking engine 302 such as the one depicted in FIG. 3.

At operation 502, events are received at the event receiver 330. Events include any movement, addition, or subtraction of inventory. Events may include purchase orders, transfer orders, sales events, and other inventory adjustment events. The event receiver 330 receives purchase orders from the purchase order generator 308 of FIG. 3. Transfer orders are received from the transfer order generator 306 of FIG. 3. Sales events are received from a point of sale system 210 or online ordering system 208 like those described in FIG. 3. In example embodiments, because the events are received as they are generated, the events can be received at the event receiver 330 from one or more data streams of inventory events reflecting a near-constant set of changes to inventory levels across the enterprise.

At operation 504, events are transformed into inventory transactions by the transformation engine 332. The transformation engine 332 converts each event into an individual transaction for each item (e.g., atomizing the events). An example schematic of this process is depicted in FIG. 6.

Figure 6:
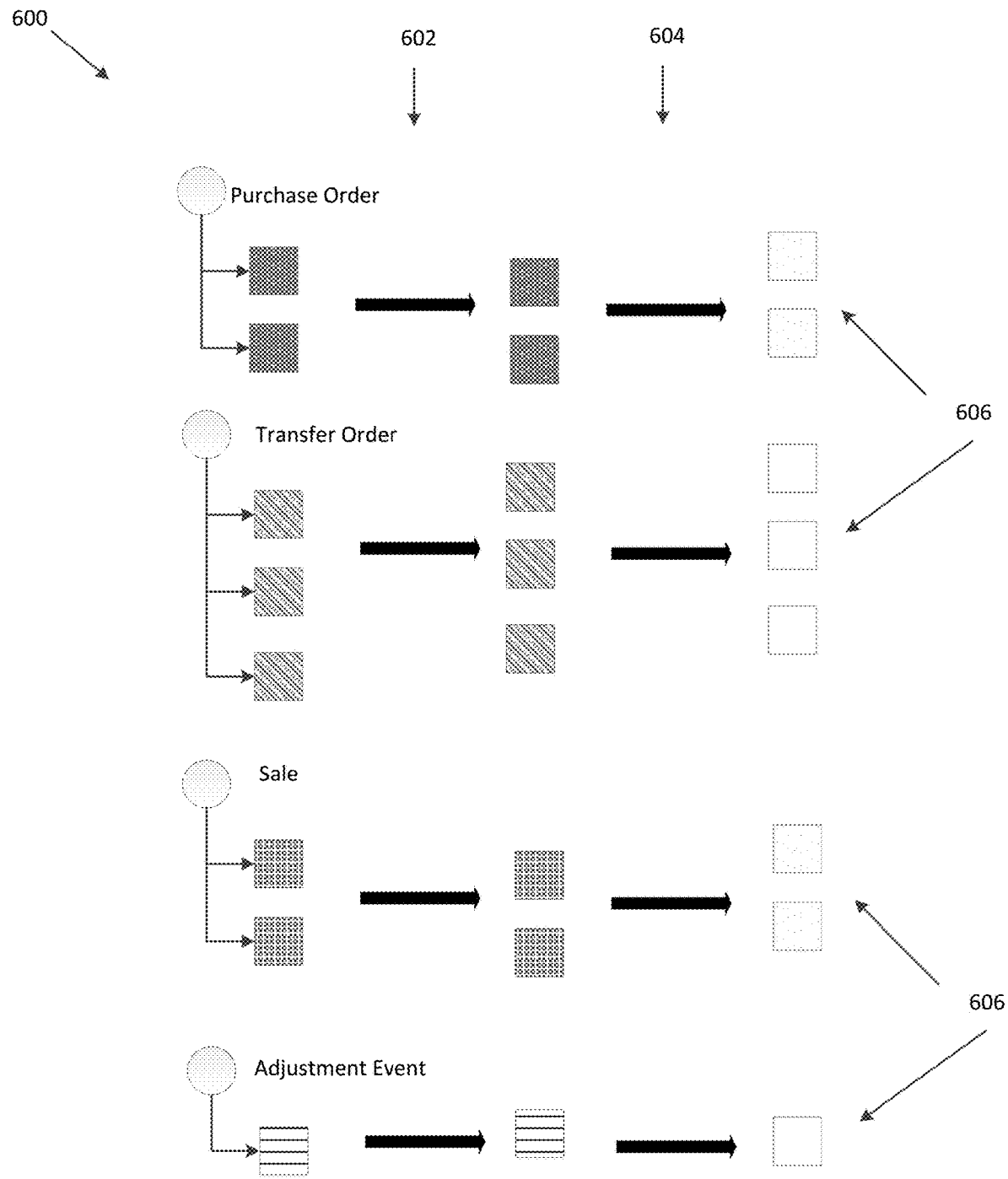
FIG. 6 is a schematic of a method of transforming inventory events into inventory transactions.

As shown in the schematic 600 of FIG. 6, in an example embodiment, events are broken down by individual item and converted to inventory transactions. Purchase orders, transfer orders, sales, and adjustment events are broken down by individual item at step 602. Each inventory transaction is then converted to one consistent format as part of the transformation process in step 604. The consistent format of the general inventory transactions 606 allows for easier analysis of current inventory counts that are processed by the transaction analyzer 334. Furthermore, breakdown of events into individual item events ensures inventory tracking is performed on a per-item basis across the enterprise, rather than having potential inventory mismatch due to use of different units (pallets, items, or multi-item packages).

Returning back to FIG. 5, at operation 506, the inventory transactions are analyzed and reconciled with the current inventory counts at each location involved in the event. The transaction analyzer 334 receives the inventory transactions 604 from the transformation engine 332. Each of the inventory transactions 604, in their consistent format, are analyzed to determine which items and locations are involved in each transaction. This process is further described below in relation to FIG. 7. The transaction analyzer 334 ultimately determines how the count for each location and item is to be adjusted for record-keeping purposes. This information is then passed along to the inventory updating engine 336.

At operation 508, the updated counts for each item in each location are recorded in an inventory data store 314 by the inventory updating engine 336 of FIG. 3. The inventory updating engine 336 determines which data to alter within the inventory data store 314 based on which locations had a change in inventory count for particular items. Accordingly, user applications can then query, e.g., via the API discussed above, to obtain near-realtime inventory levels across the organization, at a store, distribution center, or other location or set of locations within the enterprise.

Figure 7:
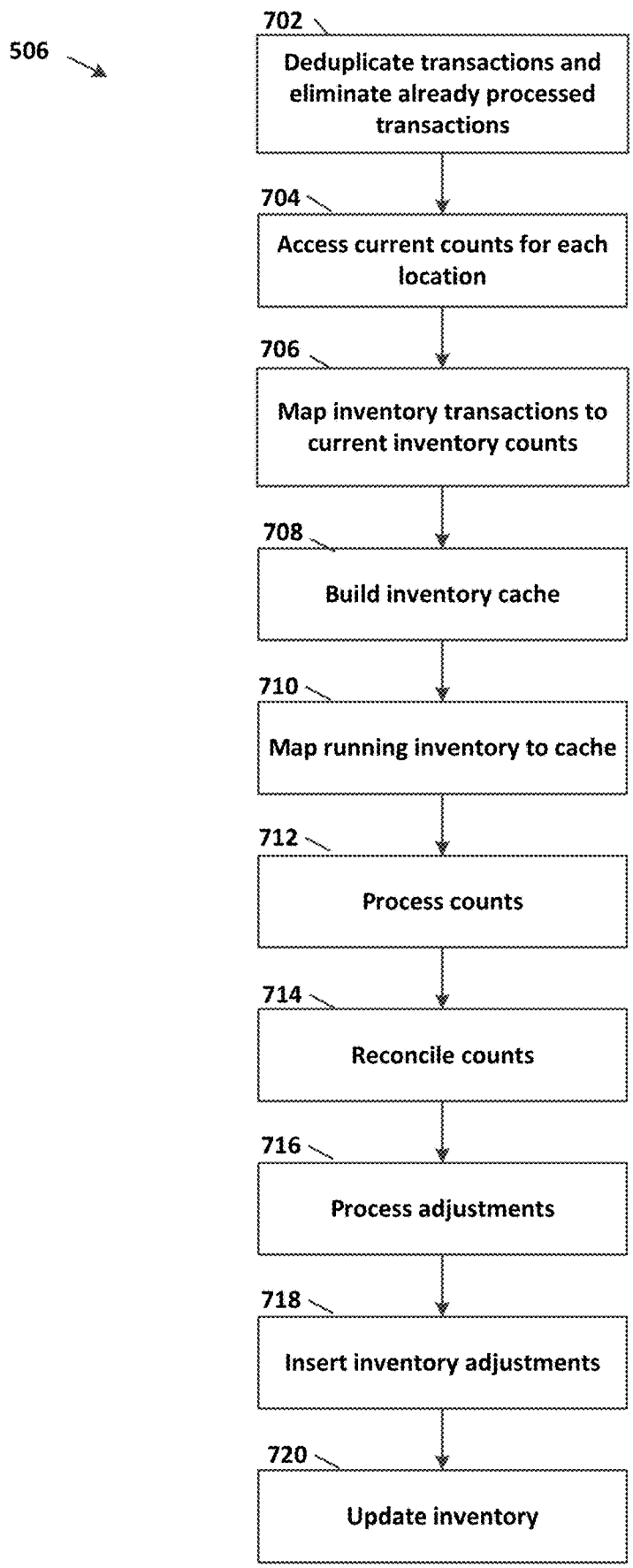
FIG. 7 displays a flow diagram of a method of analyzing inventory transactions.

FIG. 7 displays a flow diagram of a method 506 of analyzing inventory transactions. Each incoming inventory transaction is analyzed by the transaction analyzer 334 to determine how the overall inventory counts for the supply chain should be modified.

At operation 702, the inventory transactions are deduplicated to eliminate any transactions that were already processed. Any redundant transactions are identified by involving the same item and transaction ID. The deduping results in a list of inventory transactions that actually need to be processed by the inventory tracking engine 302.

At operation 704, the current counts for each location and item are accessed from the inventory data store 314. The current counts are the status of the inventory before the current transactions were received. The inventory tracking engine 302 continually updates the inventory counts at each location for each item as new transactions are received. In some embodiments, the system only accesses the counts for the items and locations that are involved in the inventory transaction that is currently being analyzed.

At operation 706, the inventory transactions are mapped to the current inventory counts. For example, inventory transactions are lined up with inventory counts based on transaction IDs and item IDs.

At operation 708, an inventory cache is built. This provides temporary storage for the inventory counts at each location, including updated inventory counts based on received events.

At operation 710, a running inventory is mapped to the inventory cache. The running inventory tracks inventory changes on a per-item basis as each inventory transaction is processed.

At operation 712, counts are processed. A method of processing counts is further described in reference to FIG. 8.

At operation 714, the counts are reconciled with the running inventory. The system ensures that all additions and subtractions from each item count are logical and have been processed in the proper order.

At operation 716, adjustments are processed. A method of processing adjustments is further described in reference to FIG. 9.

At operation 718, inventory adjustments are inserted into the running inventory count.

At operation 720, the inventory is updated. The overall counts and adjustments have been calculated for each item in the inventory transactions received at the inventory tracking engine 302. The inventory is updated by the inventory updating engine 336 by recording the new inventory counts in the inventory data store 314.

Figure 8:
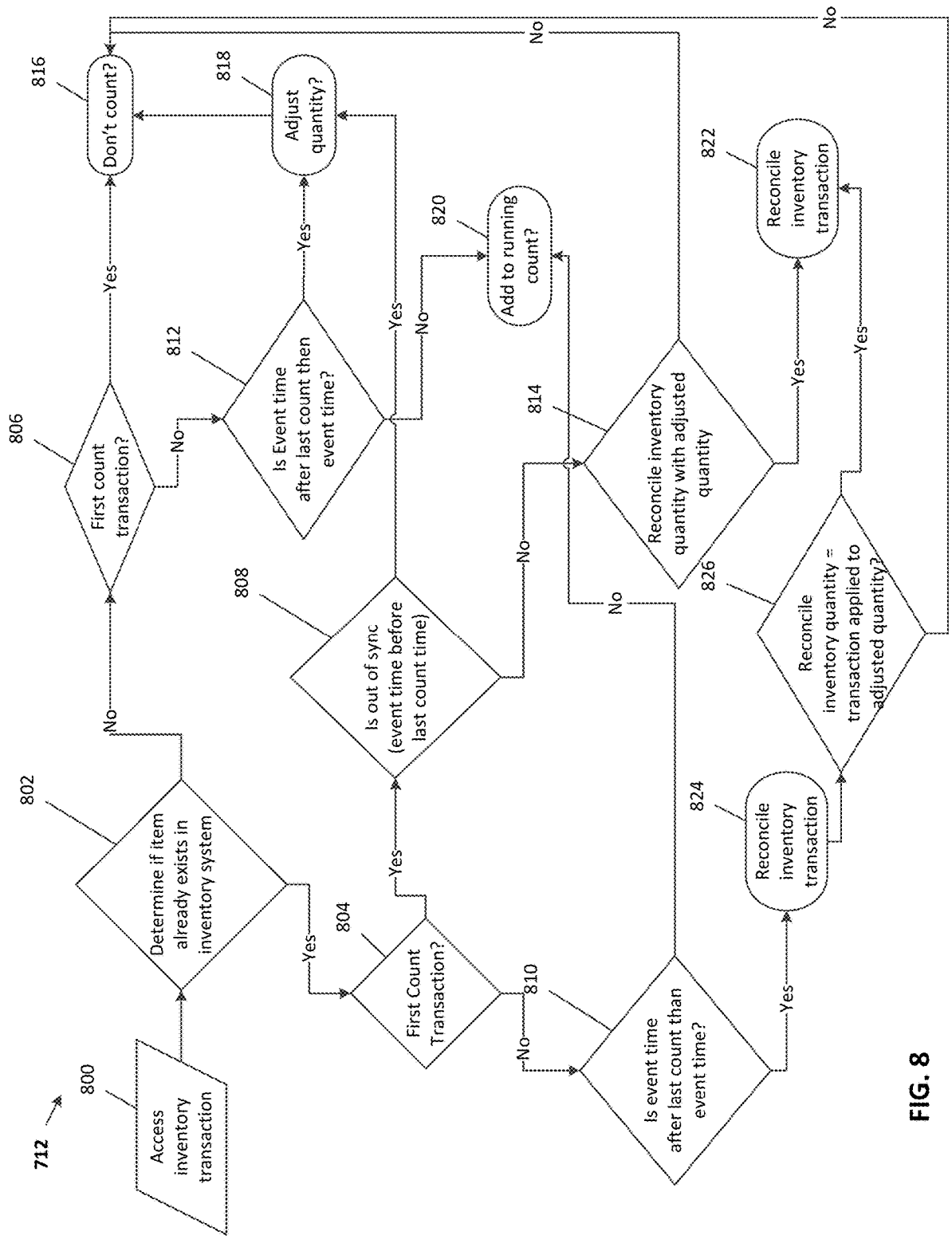
FIG. 8 displays a flow diagram of a method of processing inventory counts.

Turning now to FIG. 8, a method 712 of processing counts is provided. At operation 800, an inventory transaction is accessed. At operation 802, it is determined if an item involved in the transaction is already in the inventory system. If the item already exists in the system, the method proceeds to operation 804. If not, the method proceeds to operation 806. At both operation 804 and operation 806, the system determines whether the transaction has been counted for the first time. This checkpoint ensures that transactions are not counted more than once.

If the answer to operation 804 is yes, the method proceeds to operation 808. If no, the method proceeds to operation 810. If the answer to operation 806 is yes, the method proceeds to operation 816. If no, the method proceeds to operation 812.

At operation 808, the system determines whether the event time is before the last count time. If so, the transaction is out of sync and the method proceeds to operation 818. If the transaction is in sync, the method proceeds to operation 814.

At operation 810 and 812, the system determines whether the event time of the transaction is after the last count transaction event time. This inquiry ensures that transactions are processed in the proper order. This prevents transactions from conflicting with each other or being processed in an order that doesn't make sense (e.g. processing a sale for an item before a transfer of that item place enough inventory in a store to fulfill that sale). If the answer to operation 810 is yes, the method proceeds to operation 824. If no, the method proceeds to operation 820. If the answer to operation 812 is yes, the method proceeds to operation 818. If no, the method proceeds to operation 820.

At operation 814, the system inquires whether the inventory quantity is equal to the inventory transaction as applied to the adjusted quantity for that item. It the inventory quantity can be reconciled, the method proceeds to operation 822 where the inventory transaction is reconciled.

At operation 816, inventory transactions are not counted because the running quantity is equal to the requested quantity.

At operation 818, the quantity of a particular item is adjusted.

At operation 820, the item is added to the running count. Since the event time is not after a last count, the running count can simply be updated, rather than directly adjusting a quantity or reconciling inventory transactions.

At operations 822 and 824, the inventory transaction is reconciled.

At operation 826, it is determined whether reconciling an inventory quantity is the same as the transaction applied to an adjusted quantity. If so, the inventory transaction is reconciled at operation 822; however, if not, the inventory transaction is not counted, at operation 816.

Figure 9:
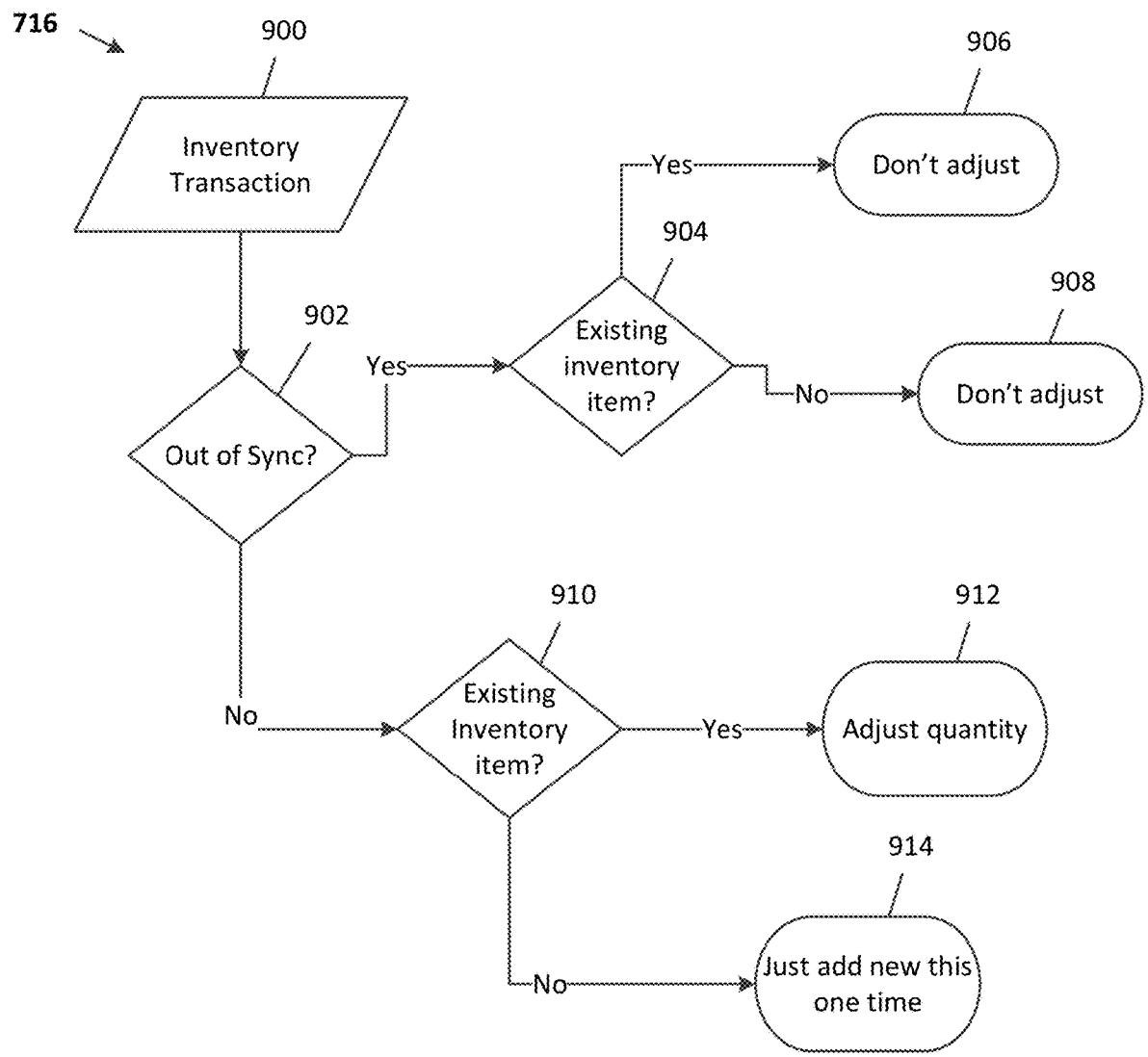
FIG. 9 displays a flow diagram of a method of processing inventory adjustments.

FIG. 9 displays a flow chart of a method 716 of processing inventory adjustments. At operation 900, the inventory transaction being analyzed is accessed.

At operation 902, the system determines if the transaction is out of sync. If the inventory adjustment is applied out of order, the method proceeds to operation 904. If the adjustment is being processed in the proper order, the method proceeds to operation 910.

At operations 904 and 910, the system determines whether the item involved in the inventory adjustment already exists within the supply chain. If the answer to inquiry 904 is yes, the method proceeds to operation 906 and the inventory is not adjusted for that item. If the answer to inquiry 904 is no, the inventory is also not adjusted? If the answer to inquiry 910 is yes, the quantity is adjusted for that item at operation 912. If the answer to inquiry 910 is no, the method proceeds to operation 914 and the item is only added to the inventory database at this time; subsequent encounters with that item will not cause addition of the item to the inventory database, since it will have previously been added (rather, a quantity will be adjusted, e.g., as in operation 912).

Figure 10:
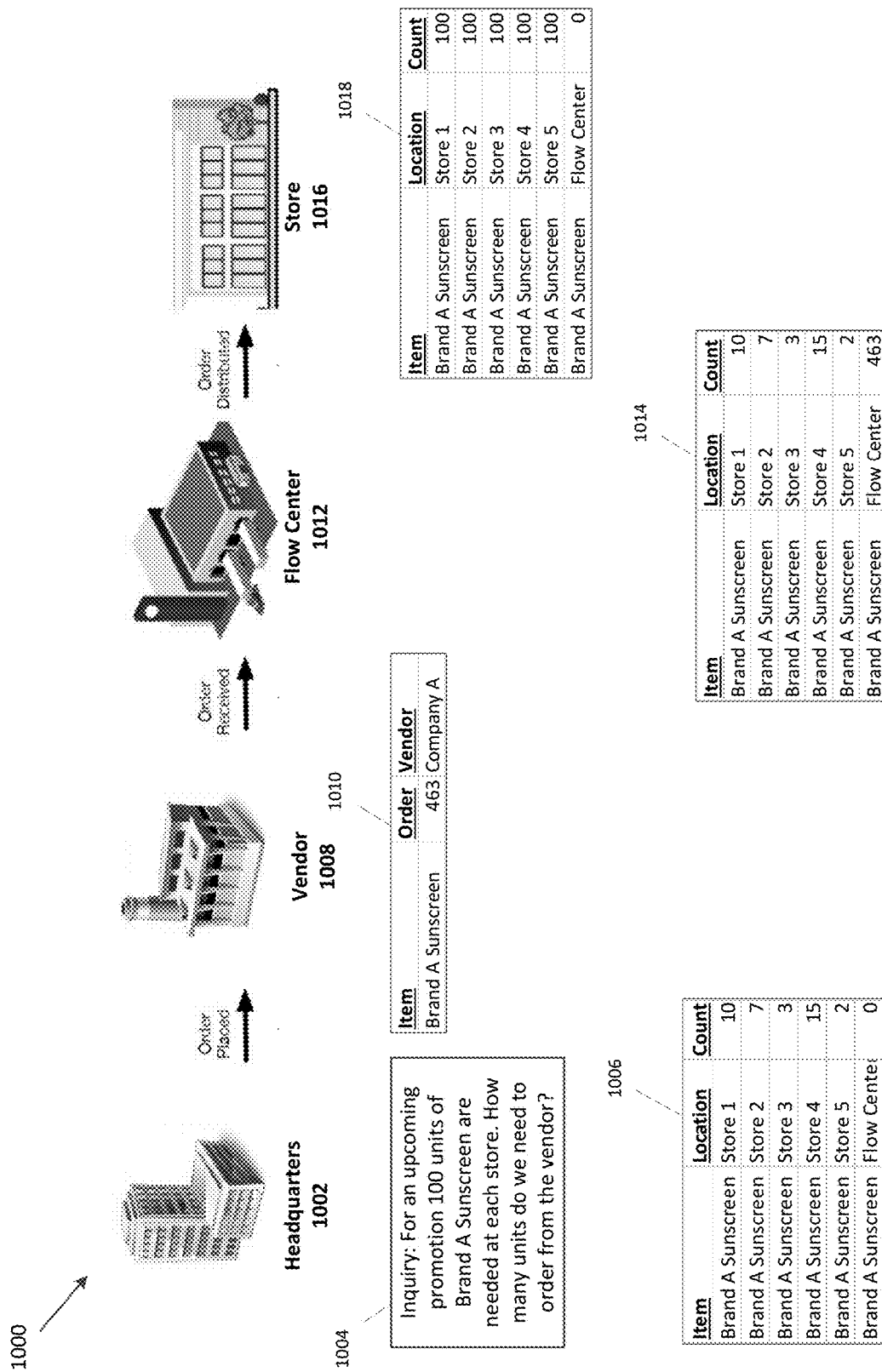
FIG. 10 illustrates an example of a request made through the API of FIG. 4.

The inventory tracking engine can be accessed by users within a retail enterprise to determine the current inventory levels on an individual item basis for each node in the supply chain (where nodes include receive centers, flow centers, and retail stores). In the example of FIG. 10, a user wants to ensure that inventory is allocated to retail stores in a quantity large enough to satisfy expected demand for an upcoming promotion. In this example, the user at the retailer headquarters 1002 has submitted an inquiry 804 indicating that 100 units of Brand A Sunscreen needs to be stocked and available in each retail store. In this situation, Stores 1-5 are all serviced by the same flow center.

At the time of the user inquiry, the item count 1006 shows that the flow center does not have any stock of the product and each store has 15 or less units of the product. The inventory management system accesses information provided by the inventory tracking engine to determine the current stock levels of the product in each of the stores and then calculates the number of units of product that are needed to satisfy the request. In this example, the inventory management system determines that 463 additional units are needed. The inventory request is made to the replenishment management system, which determines where to obtain the additional units of product. In this example, the additional units are requested through a purchase order made to a vendor 1008. Once the vendor has fulfilled the order 1010 for 463 units, the flow center 1012 receives the product.

The inventory tracking engine recognizes that the inventory has been added to the supply chain and that the additional units are now in the flow center. This is reflected in an updated item count 1014 showing that 463 units are at the flow center. Then, the inventory management system informs the transportation management system of the number of additional units of the product that are needed by each individual retail store. The transportation management system then distributes the product to the retail stores 1016. The final item count 1018 indicates that each store is carrying the requested 100 units and the flow center's supply of Brand A Sunscreen has now been exhausted again.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for tracking inventory across a supply chain including a plurality of retail locations and a plurality of distribution locations, the system comprising:
   a computing system including a processor, and a memory communicatively coupled to the processor, the memory storing instructions executable by the processor to execute an inventory management system including an inventory tracking engine, wherein the inventory tracking engine operates to:
      receive a plurality of inventory events generated by two or more external computing systems, the plurality of inventory events comprising realtime datastreams representing movements, additions, or subtractions of inventory at any of the plurality of retail locations and the plurality of the distribution locations, wherein the plurality of inventory events comprise at least a first inventory event having a first unit of measure for items included in the first inventory event and a second inventory event having a second unit of measure for items included in the second inventory event that is different from the first unit of measure;
      normalize the one or more inventory events by atomizing each of the plurality of inventory events into separate inventory transactions for each item involved in each inventory event;
      convert the inventory transactions to a single format;
      map the inventory transactions to an inventory cache representative of running counts of inventory transactions relative to each of the plurality of inventory locations;
      analyze the inventory transactions from the inventory cache to determine a running count of how many units of each item moved to or from each location involved in the events; and
      record updated inventory counts in an inventory database by resolving the running count against an individual inventory count for each item at each location;
   the memory further storing instructions executable by the processor to execute a replenishment management system, wherein the replenishment management system operates to:
      receive a reactive item demand signal from an online ordering system and one or more point of sale systems indicating a sale of an item has occurred;
      receive a proactive item demand signal from a demand forecast engine that generates the proactive item demand signal by predicting expected customer demand for one or more items on a day by day basis, wherein predicting expected customer demand includes determining a demand probability distribution for each item at each retail and distribution location for a given timeframe, wherein the demand probability distribution includes determining probabilities of a plurality of different possible rates of sale occurring for each item, wherein the rate of sale most likely to occur, as indicated by the demand probability distribution, corresponds at least in part to an amount of item inventory needed to support the expected customer demand;
      communicate the reactive and proactive item demand signals to the inventory management system;
      wherein, responsive to the updated inventory counts, the reactive item demand signal, the proactive item demand signal, and a user-defined availability goal which dictates a cumulative percent of possible sales values that must be made possible based on the demand probability distribution, the inventory management system determines that additional inventory is needed at least one of the plurality of retail and distribution locations across the supply chain and either:
         (i) issues a transfer order to transfer the additional inventory from another one of the plurality of retail and distribution locations to the at least one of the plurality of retail and distribution locations; or
         (ii) issues a purchase order to order the additional inventory for the at least one of the plurality of retail and distribution locations from a vendor when the inventory management system determines that the cost of transferring the additional inventory under the transfer order is costlier than the purchase order.

2. The system of claim 1, wherein inventory events include transfer orders, purchase orders, sales events, inventory adjustment events, and combinations thereof.

3. The system of claim 1, further comprising an application programming interface providing access to near-real-time inventory information.

4. The system of claim 3, wherein the inventory information comprises per-item inventory information at one or more of a store level, a region level, or an enterprise level.

5. The system of claim 1, wherein the inventory database maintains near-realtime inventory information.

6. The system of claim 1, wherein a query received at an application programming interface provides access to near-realtime inventory levels reflected in the inventory database without requiring aggregation of inventory information from store-level inventory systems.

7. The system of claim 1, wherein the computing system comprises a plurality of computing devices.

8. The system of claim 1, wherein the computing system comprises a first computing system hosting the inventory tracking engine which is communicatively connected to a second computing system hosting the replenishment management system.

9. The system of claim 1, wherein the inventory database is hosted at a second computing system separate from the computing system.

10. A method of tracking inventory across a supply chain including a plurality of retail locations and a plurality of distribution locations, the method comprising:
   receiving, at a computing system, a plurality of inventory events generated by two or more external computing systems, the plurality of inventory events comprising realtime datastreams representing movements, additions, or subtractions of inventory at any of the plurality of retail locations and the plurality of distribution locations, wherein the inventory events comprise transfer orders, purchase orders, sales, and inventory adjustments and the plurality of inventory events comprise at least a first inventory event having a first unit of measure for items included in the first inventory event and a second inventory event having a second unit of measure for items included in the second inventory event that is different from the first unit of measure;

normalizing, with the computing system, the plurality of inventory events by atomizing each inventory event into separate inventory transactions for one or more items involved in the inventory event;
converting the inventory events to a single format;
mapping the inventory transactions to an inventory cache representative of running counts of inventory transactions relative to each of the plurality of inventory locations;
analyzing, with the computing system, the inventory transactions from the inventory cache to determine a running count of how many units of each of the one or more items have moved to or from each location involved in the inventory events; and
recording updated inventory counts for each item and each location in an inventory database;
receiving a reactive item demand signal from an online ordering system and one or more point of sale systems indicating a sale of an item has occurred;
receiving a proactive item demand signal from a demand forecast engine that generates the proactive item demand signal by predicting expected customer demand for one or more items on a day by day basis, wherein predicting expected customer demand includes determining a demand probability distribution for each item at each retail and distribution location for a given timeframe, wherein the demand probability distribution includes determining probabilities of a plurality of different possible rates of sale occurring for each item, wherein the rate of sale most likely to occur, as indicated by the demand probability distribution, corresponds at least in part to an amount of item inventory needed to support the expected customer demand;
responsive to the updated inventory counts, the reactive item demand signal, the proactive item demand signal, and a user-defined availability goal which dictates a cumulative percent of possible sales values that must be made possible based on the demand probability distribution, determining with the computing system that additional inventory is needed at least one of the plurality of retail and distribution locations and either:

(i) issuing with the computing system a transfer order to transfer the additional inventory from another one of the plurality of retail and distribution locations to that at least one of the plurality of retail and distribution locations; or (ii) issuing a purchase order to order the additional inventory for the at least one of the plurality of retail and distribution locations from a vendor when the computing system determines that the cost of transferring the additional inventory under the transfer order is costlier than the purchase order.

11. The method of claim 10, further comprising providing, through an Application programming interface, near-realtime inventory level information to a user application.

12. The method of claim 11, wherein providing the near-realtime inventory level information occurs without requiring aggregation of inventory information from store-level inventory systems.

13. The method of claim 11, wherein the near-realtime inventory level information is per-item near-realtime inventory level information.

14. The method of claim 10, further comprising, for each transaction, determining if the transaction is associated with an item included in the inventory database.

15. The method of claim 14, further comprising, upon determining that the transaction is associated with an item not in the inventory database, adding the item to the inventory database.

16. The method of claim 10, further comprising determining whether an inventory count for an item identified in the transaction is out of sync, and in response to determining that an inventory count is out of sync, delaying adjustment of an inventory count associated with the item.

17. The method of claim 16, wherein the inventory count associated with the item is due to the item being in transit.

18. The method of claim 16, wherein the inventory count associated with the item is out of sync due to the item being selected for purchase by a customer.

* * * * *